United States Patent
Pulivarthi et al.

(10) Patent No.: US 12,530,234 B1
(45) Date of Patent: Jan. 20, 2026

(54) SEQUENTIAL WORKFLOW ORCHESTRATION MODEL SYSTEM AND METHOD

(71) Applicant: Morgan Stanley Services Group Inc., New York, NY (US)

(72) Inventors: Balakrishna Pulivarthi, Cumming, GA (US); Kumar Abhinav, Cumming, GA (US); Kavitha Bandarupalli, Cumming, GA (US); Jensen Zhang, Brooklyn, NY (US); Vamsi Katneni, Alpharetta, GA (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/179,572

(22) Filed: Apr. 15, 2025

(51) Int. Cl.
*G06F 9/50* (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS

| | | | | |
|---|---|---|---|---|
| 7,398,525 | B2 * | 7/2008 | Leymann | G06Q 10/103 718/104 |
| 10,409,642 | B1 * | 9/2019 | Tang | G06F 9/5005 |
| 10,810,089 | B1 * | 10/2020 | Gu | G06F 11/1448 |
| 11,106,492 | B2 * | 8/2021 | Shanmugam | H04W 4/50 |
| 2003/0093575 | A1 * | 5/2003 | Upton | G06F 9/541 719/310 |
| 2003/0144891 | A1 | 7/2003 | Leymann et al. | |
| 2003/0236689 | A1 * | 12/2003 | Casati | G06Q 10/06316 705/7.26 |
| 2004/0078778 | A1 | 4/2004 | Leymann et al. | |
| 2005/0044197 | A1 * | 2/2005 | Lai | H04L 67/02 709/223 |
| 2006/0015873 | A1 * | 1/2006 | Dettinger | G06F 9/5038 718/102 |
| 2007/0157204 | A1 | 7/2007 | Leymann et al. | |

(Continued)

OTHER PUBLICATIONS

Singh et al.; "Optimizing Grid-Based Workflow Execution"; Journal of Grid Computing (2006) 3: 201-219; Springer 2006; DOI: 10.1007/s10723-005-9011-7 (Singh_2006.pdf) (Year: 2006).*

*Primary Examiner* — Hiren P Patel
(74) *Attorney, Agent, or Firm* — Leason Ellis LLP

(57) ABSTRACT

A computer-implemented system and method for managing and executing activities for uninterrupted processing. At least one process definition representing a plurality of activities to be executed by computing devices located outside of at least one firewall associated with a data communications network is accessed. Respective ones of the plurality of activities are identified and, for each: input representing details associated with the respective one of the plurality of activities is accessed and at least one computing device is determined to execute steps associated with the respective one of the plurality of activities. Information associated with the respective one of the plurality of activities is transmitted to the computing device(s). A response representing output from the executed steps associated with the respective one of the plurality of activities is received and stored.

18 Claims, 9 Drawing Sheets

(56) References Cited

U.S. PATENT DOCUMENTS

| | | | |
|---|---|---|---|
| 2007/0168868 A1* | 7/2007 | Korzenko | G06F 40/117 715/202 |
| 2007/0192118 A1 | 8/2007 | Bukovec | |
| 2008/0103786 A1* | 5/2008 | Zhang | G06Q 30/00 705/348 |
| 2008/0229314 A1* | 9/2008 | Hirose | G06F 9/544 718/102 |
| 2008/0307392 A1* | 12/2008 | Racca | G06F 8/34 717/120 |
| 2009/0241117 A1 | 9/2009 | Dasgupta et al. | |
| 2010/0153167 A1* | 6/2010 | Kretzschmar | G06Q 10/00 715/229 |
| 2012/0060150 A1 | 3/2012 | Pechanec et al. | |
| 2012/0290350 A1* | 11/2012 | Ohsaki | G06Q 10/063114 705/7.13 |
| 2012/0297390 A1 | 11/2012 | Heath, III et al. | |
| 2015/0242786 A1 | 8/2015 | Abraham et al. | |
| 2016/0110687 A1 | 4/2016 | Kamat et al. | |
| 2017/0017522 A1* | 1/2017 | Daga | G06F 9/46 |
| 2019/0303207 A1* | 10/2019 | Vadapandeshwara | G06F 9/5038 |
| 2021/0004273 A1* | 1/2021 | You | G06F 9/5066 |
| 2021/0042154 A1* | 2/2021 | Nasu | G05B 19/0426 |
| 2022/0283878 A1* | 9/2022 | Cao | G06F 9/52 |
| 2023/0251854 A1 | 8/2023 | Jayapathi et al. | |
| 2023/0275860 A1* | 8/2023 | Popelka | H04L 51/56 709/224 |
| 2024/0152847 A1 | 5/2024 | Jayapathi et al. | |

* cited by examiner

High Level Diagram

Flow Diagram – Pre Activity

One Auto Processor - Flow Diagram

Flow Diagram – Invoke App

SEQUENTIAL WORKFLOW ORCHESTRATION MODEL SYSTEM AND METHOD

FIELD

The present disclosure relates, generally, to data processing and, more particularly, to eliminating delays associated with activities in business process operations.

BACKGROUND

Business process management can involve a plurality of processors, each performing respective tasks in connection with one or more software applications. Such applications can be configured with computing devices located remotely, which can add delays and cause latency in business process management processes. Moreover, each of the computing devices can access one or more metadata databases to receive information associated with business processes and steps associated therewith. Accessing at least one metadata database by each of a plurality of computing processes also can cause latency. Still further, business process steps are often performed sequentially, and each of the processors can depend on outcome from steps performed by other ones of the processors. Latency can increase further, for example, due to processors waiting for outcome of processors accessing metadata databases and interfacing with external applications.

Unfortunately, latency, such as described herein, can negatively impact business process management productivity and performance. It is with respect to these and other considerations that the disclosure made herein is presented.

BRIEF SUMMARY

In one or more implementations of the present disclosure, a computer-implemented system and method are provided for managing and automatically executing activities for uninterrupted computing processing. At least one process definition is accessed, which represents a plurality of activities to be executed by computing devices located outside of at least one firewall associated with a data communications network. Respective ones of the plurality of activities are identified and, for each respective activity, input representing details associated with the respective one of the plurality of activities is accessed. Further, for each respective activity, at least one computing device is determined to execute steps associated with the respective one of the plurality of activities. Further, information associated with the respective one of the plurality of activities is transmitted to the computing device(s). A response representing output from the executed steps associated with the respective one of the plurality of activities is received and stored.

In one or more implementations, the input representing details associated with the respective one of the plurality of activities includes a respective application programming interface ("API"). Furthermore, transmitting the information to the at least one respective computing device is via the respective API.

In one or more implementations, for at least one of the plurality of activities, the at least one computing device is configured for performing pre-processing comprising updating an activity audit log with information representing the at least one of the plurality of activities.

In one or more implementations, the at least one computing device is configured for determining the input includes content formatted in extensible style sheet language. Further, the at least one computing device is configured for translating the content from the extensible style sheet language to extensible markup language.

In one or more implementations, the at least one computing device is further configured for issuing a service call through a service proxy API to transmit the information associated with the respective one of the plurality of activities to the at least one respective computing device.

In one or more implementations, the at least one computing device is further configured for post-processing, for at least one of the plurality of activities.

In one or more implementations, the post-processing comprises at least one of: updating an activity log; updating at least one database with workflow attributes for future processing; and adding information associated with another activity in at least one database.

In one or more implementations, the at least one computing device is further configured for: determining output received from the at least one respective computing device includes content formatted in extensible style sheet language; and translating the output from the extensible style sheet language to extensible markup language.

In one or more implementations, the at least one computing device is further configured for accessing metadata stored in at least one database, wherein the metadata includes information associated with the respective plurality of activities.

Other features of the present disclosure are shown and described herein.

BRIEF DESCRIPTION OF THE DRAWINGS

Aspects of the present disclosure will be more readily appreciated upon review of the detailed description of its various embodiments, described below, when taken in conjunction with the accompanying drawings, of which.

DETAILED DESCRIPTION OF THE EMBODIMENTS

By way of summary and introduction, the present disclosure includes technology for orchestrating sequential execution of technological steps in a business process with reduced or no wait time between each respective step in the process. Such steps can relate, for example, to execution and routing processes. In operation, activities managed by a business process can execute in a single process instance, in which steps execute sequentially to completion until respective exit criteria are reached. Features shown and described herein result in reducing wait times between activities, which in turn reduce overall completion time of the business process. Further, operations can occur on a single node, which eliminates a need for context switching and improves effectiveness of network bandwidth utilization. Moreover, execution of specific workflows, as well as tracking and monitoring thereof are simpler, faster, and easier.

In one or more implementations of the present disclosure, initiation occurs in response to user activity, to system scheduled jobs, or to discovery of one or more conditions such as by one or more automatic processes (e.g., a demon process, as known in the art). For example, a graphical user interface (e.g., a "front-end" software application) that includes graphical controls enabling selection of one or more options associated with a business process can operate on one or more computing devices. In one or more implementations, a web application can be configured to provide API service call that can create a process entry, which can be an insert entry to database as a starting processing step. This can be queued to be picked up by an auto controller (FIG. 3), which can request an auto processor to handle the process request.

In response to user selections, a request formatted in XML can be generated. The request can identify an API that provides access to one or more external services, such as computing devices and applications that provide services associated with a respective business process. Once the request is executed, the respective request can invoke operations performed by an auto processor. Alternatively (or in addition), system scheduled jobs can include auto controllers (e.g., one or more processors) that operate to collect workflows to be processed and used by the auto processor to perform specific activities associated with a business process seamlessly and sequentially, without delay.

Figure 1:
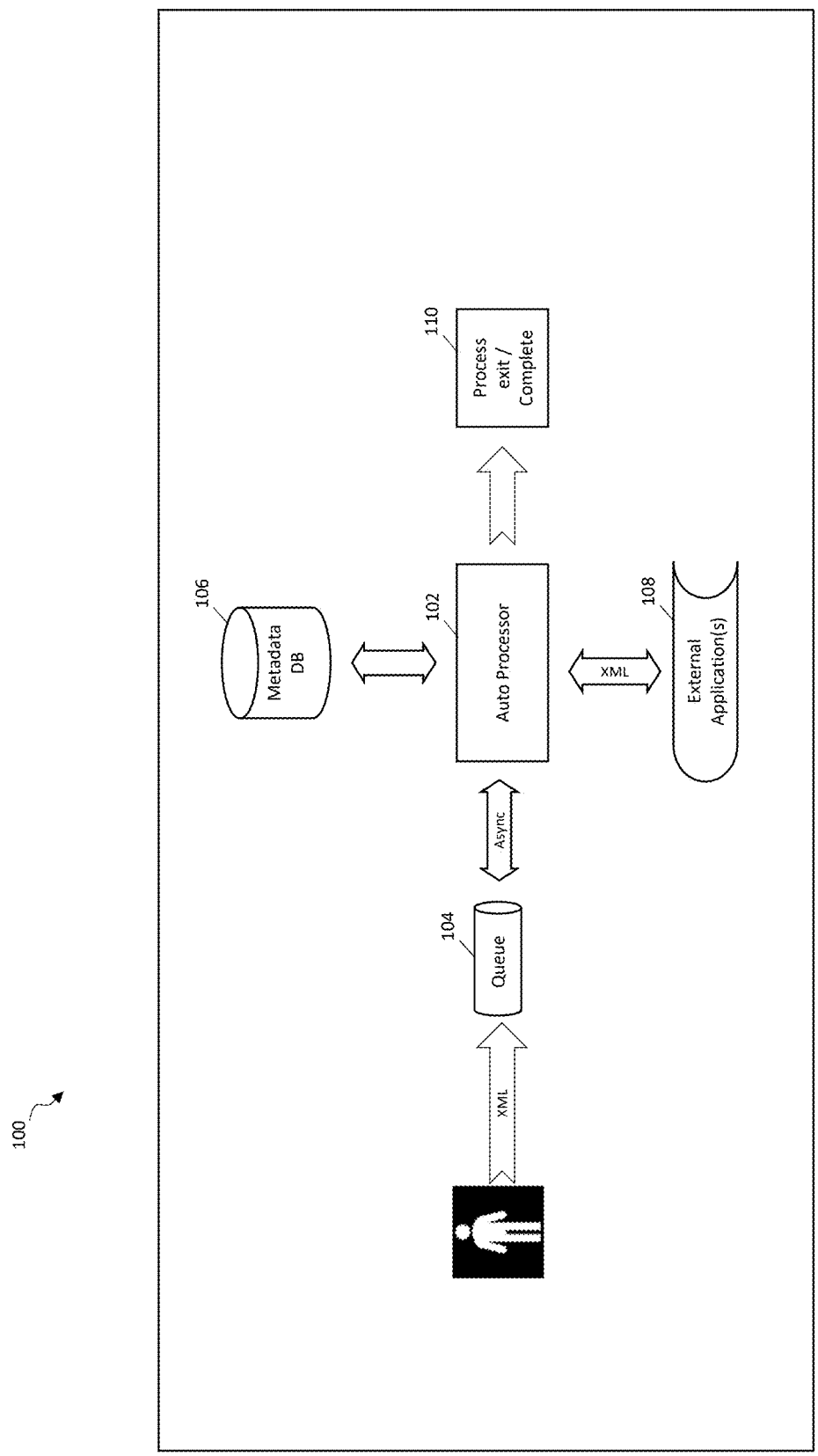
FIG. 1 is a simple block diagram illustrating a high-level view of an implementation of the present disclosure.

An example implementation of the present disclosure is illustrated in FIG. 1, including an auto processor 102 having an asynchronous connection to queue 104, which can comprise data, instructions, parameters, or other content formatted in extensible markup language ("XML") for processing. Auto processor 102 can be configured by executing programming instructions, for example, that are stored on non-transitory processor readable media, to access one or more databases that store metadata, such as information associated with data received via queue 104. Although auto processor 102 is illustrated as a single processor, a plurality of auto processors can be configured in one or more implementations of the present disclosure, as auto processor 102, for example, to share load requirements. For example, a server instance can be configured to run multiple instances of auto processors 102 based on server load requirements. Data can be processed by auto processor 102, for example, and the processed data can be provided to one or more external applications 108. The auto processor 102 operates to complete steps and, upon receiving an exit or other suitable criteria, terminates the process.

Figure 2:
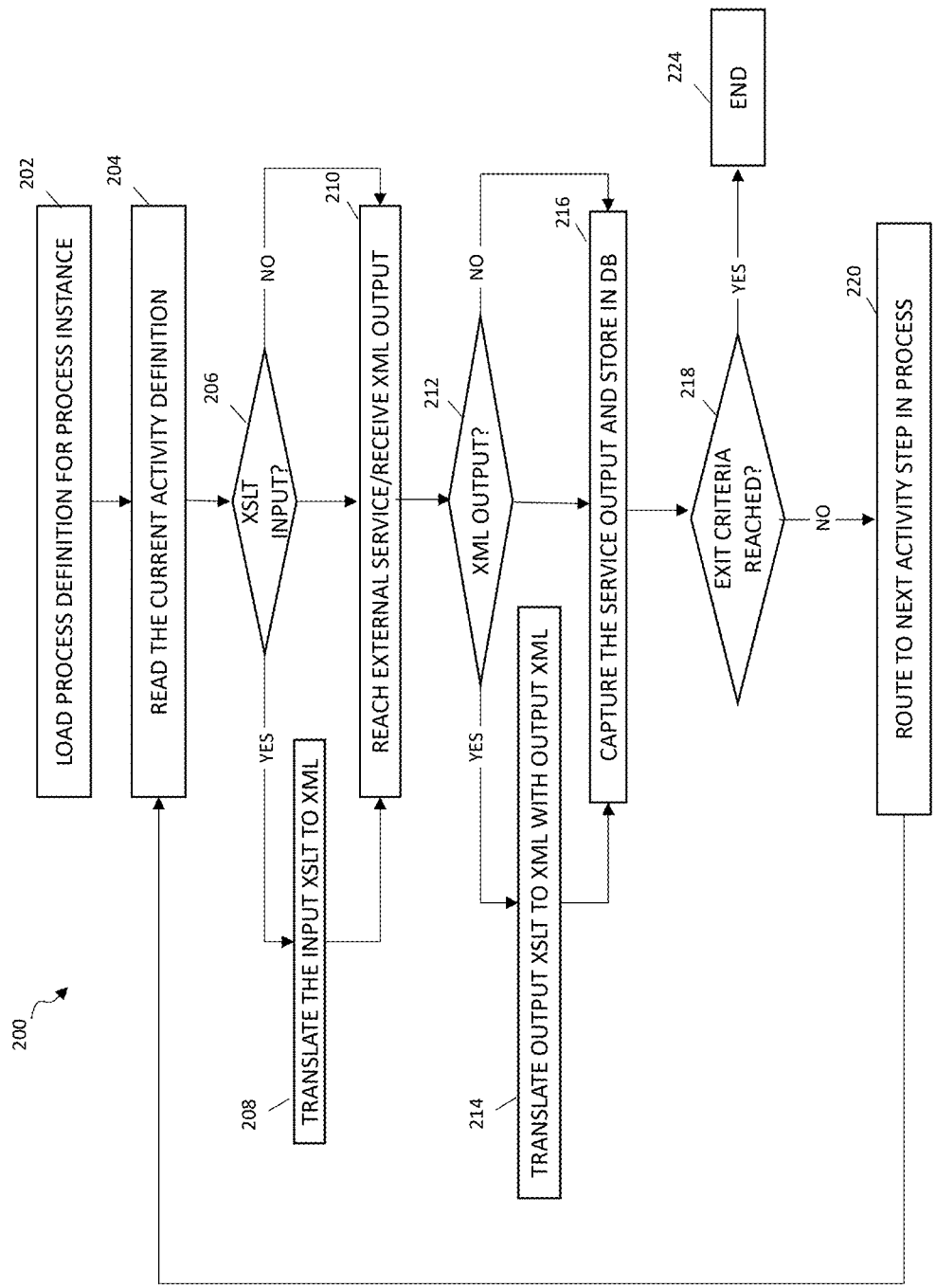
FIG. 2 is a flow diagram showing an example routine that illustrates a broad aspect of a method for implementing processing, in accordance with one or more embodiments of the present disclosure.

FIG. 2 is a flow diagram showing an example routine 200 that illustrates a broad aspect of a method for implementing processing, in accordance with one or more embodiments of the present disclosure. It is to be appreciated that several of the logical operations shown and described herein are implemented as a sequence of computer-implemented acts or program modules running on one or more computing devices. Accordingly, the logical operations described herein are referred to variously as operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

Continuing with reference to FIG. 2, the process begins at step 202 and a process definition is loaded via auto processor 102, in connection with one of a series of tasks set forth in a business process. At step 204, the current activity definition associated with the process definition loaded in step 202 is read. Thereafter, a determination is made whether the current activity definition includes content formatted in the extensible style sheet language transformations ("XSLT") (step 206). If the determination at step 206 is affirmative, then the process branches to step 208 and the input XSLT is converted to XML. Thereafter, the process continues to step 210. Alternatively, if the determination at step 206 is negative, then the process branches to step 210 and an external service, such as an application executing on a computing device located outside of at least one firewall associated with a data communications network to which auto processor 102 is connected, is reached and output from the external service received by the auto processor 102. As used herein, a data communications network refers, generally, to a system of devices enabling transfer of information via one or more data protocols and channels.

Continuing with reference to the process flow shown in FIG. 2, a determination is made whether the output received from the external service includes content formatted in XSL (step 212). If the determination at step 212 is affirmative, then the process branches to step 214 and the output XSLT is converted to XML. Thereafter, the process continues to step 216. Alternatively, the determination at step 212 is negative, then the process branches to step 216 and output from the external service is stored in one or more databases. Thereafter, the process continues to step 218 and a determination is made whether exit criteria have been reached (step 218). In one or more implementations of the present disclosure, a metadata database 308 (FIG. 3) can be accessed that stores definition information associated with respective activity, including associated with exit criteria. Moreover, and without limitation, activity status can include ready, running, completed. Based on a respective activity type, an auto processor 102 can continue to a subsequent processing activity or stop processing, including as represented in definition information stored in metadata database 308. If the determination at step 218 is negative, then the process branches to step 220 and the next activity step in the process is routed to auto processor 102. Thereafter, the process continues two step 204. Alternatively, if the determination at step 218 is affirmative, then the process branches to step 224 and ends.

Figure 3:
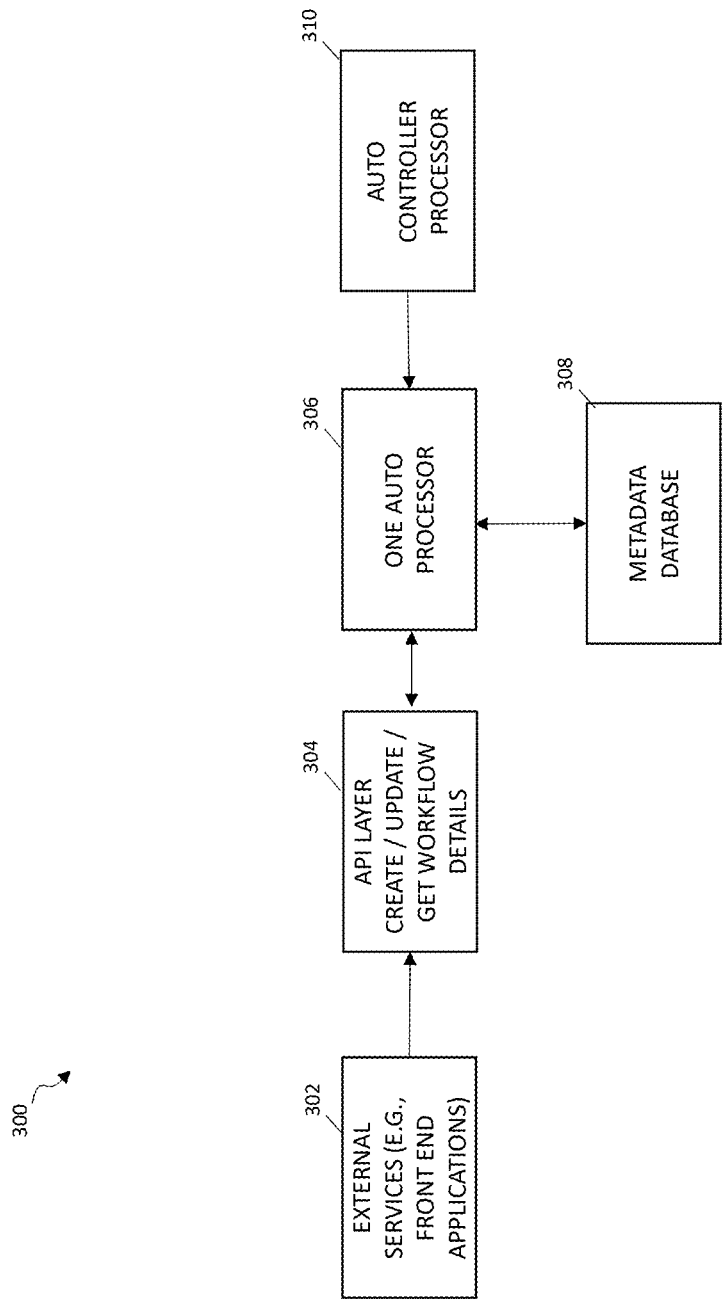
FIG. 3 illustrates a high-level assembly diagram including aspects, in connection with an example implementation of the present disclosure.

FIG. 3 illustrates a high-level assembly diagram including aspects 300, in connection with an example implementation of the present disclosure. External services 302, such as front end software applications, provide information by an application programming interface ("API") layer 304. For example, workflow details in connection with a respective business process that includes a plurality of discrete steps can be created, updated, and/or retrieved via an API layer. One auto processor 102 via API layer 304 and metadata database 308 processes information, including via auto controller processor 310. In operation, auto controller processor 310 can periodically check unprocessed entries, batch those entries for processing, and invoke the auto processor 102 to complete activity (e.g., a series of activities) associated with the processing.

Figure 4:
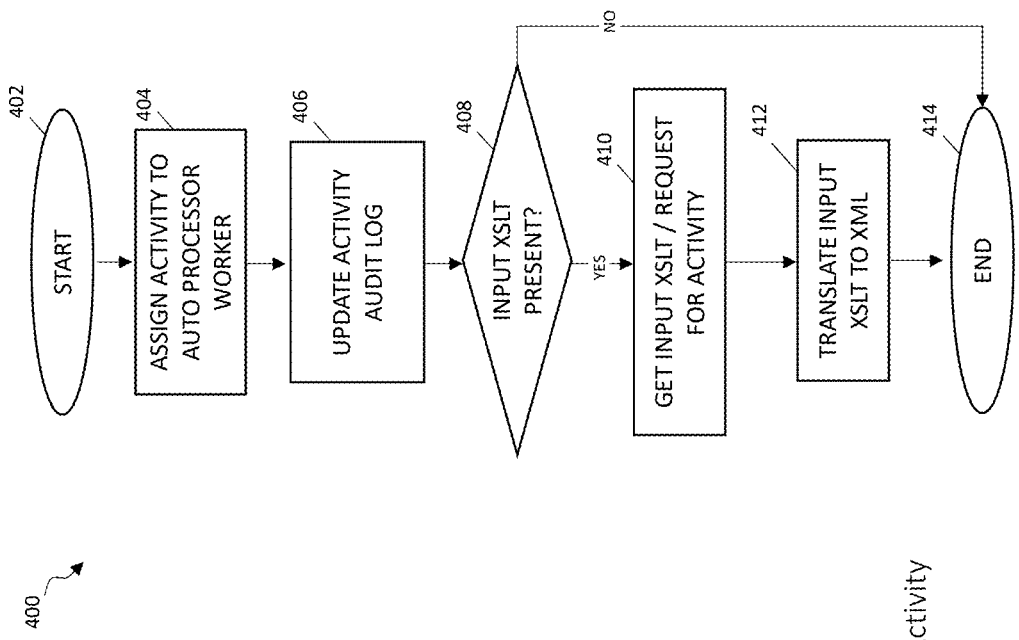
FIG. 4 is a diagram illustrating an example process flow including steps associated with pre-activity, in connection with an example implementation of the present disclosure.

FIG. 4 is a diagram illustrating an example process flow including steps 400 associated with pre-activity, in connection with an example implementation of the present disclosure. At step 402, the process starts and activity is assigned to working steps associated with an auto processor 102 (step 404). At step 406, an activity audit log is updated. Thereafter, at step 408 a determination is made whether input includes content formatted in XSLT. If the determination at step 408 is affirmative, then the process branches to step 410 and input formatted in XSLT and requests for activity are accessed. Thereafter, at step 412, the input formatted in XSLT is translated to XML. Thereafter, the process continues to step 414 and ends. Alternatively, if the determination at step 408 is negative, then the process branches to step 414 and ends.

Figure 5:
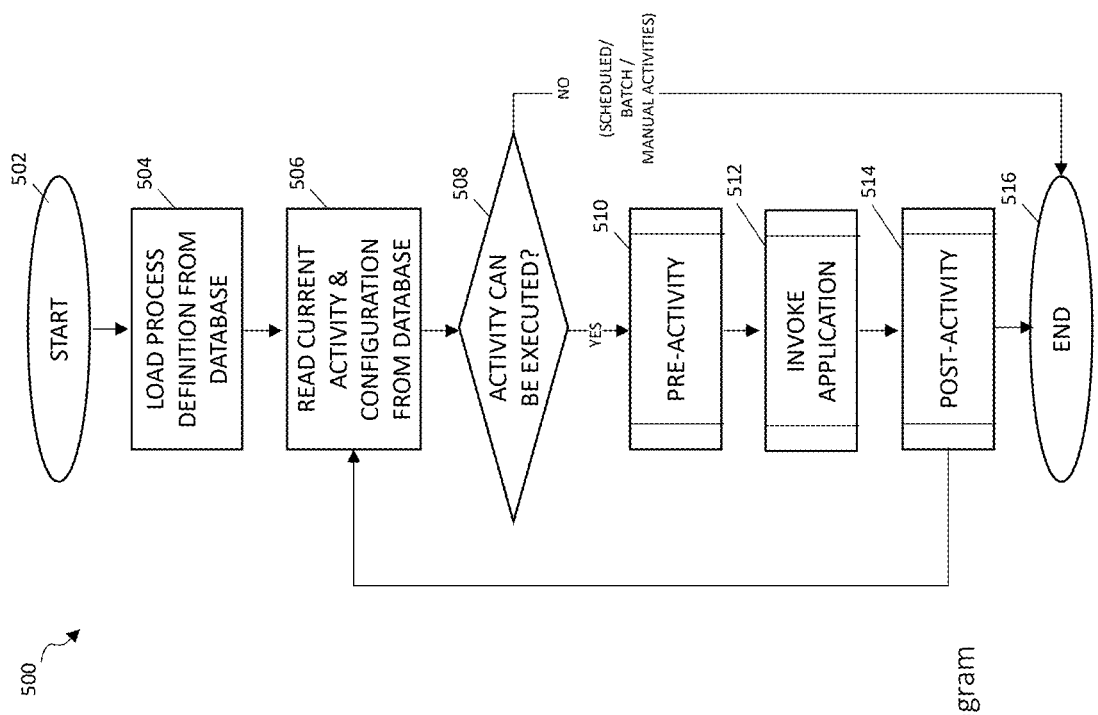
FIG. 5 is a diagram illustrating an example process flow including steps associated with auto processor operations, in accordance with an example implementation of the present disclosure.
Figure 6:
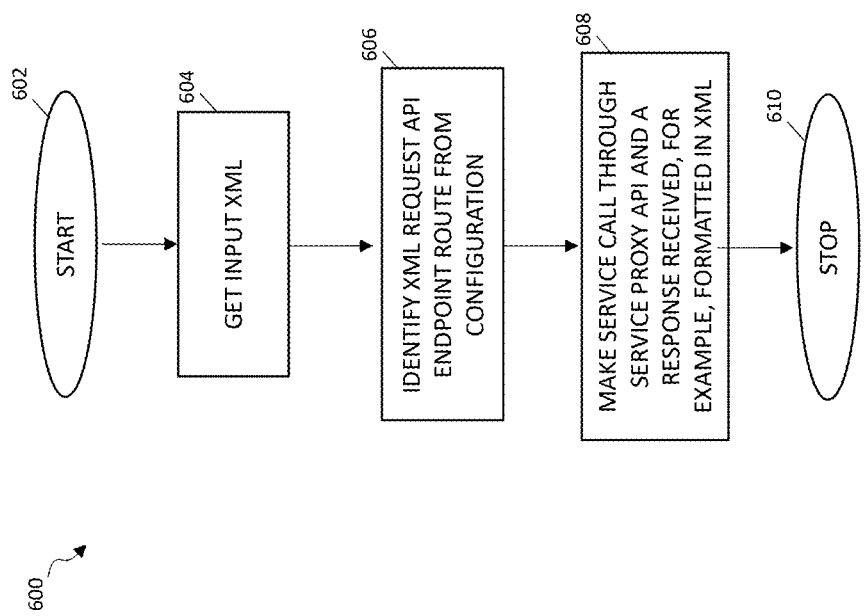
FIG. 6 is a diagram illustrating an example process flow, including steps associated with invoking an application, in accordance with an example implementation of the present application.
Figure 7:
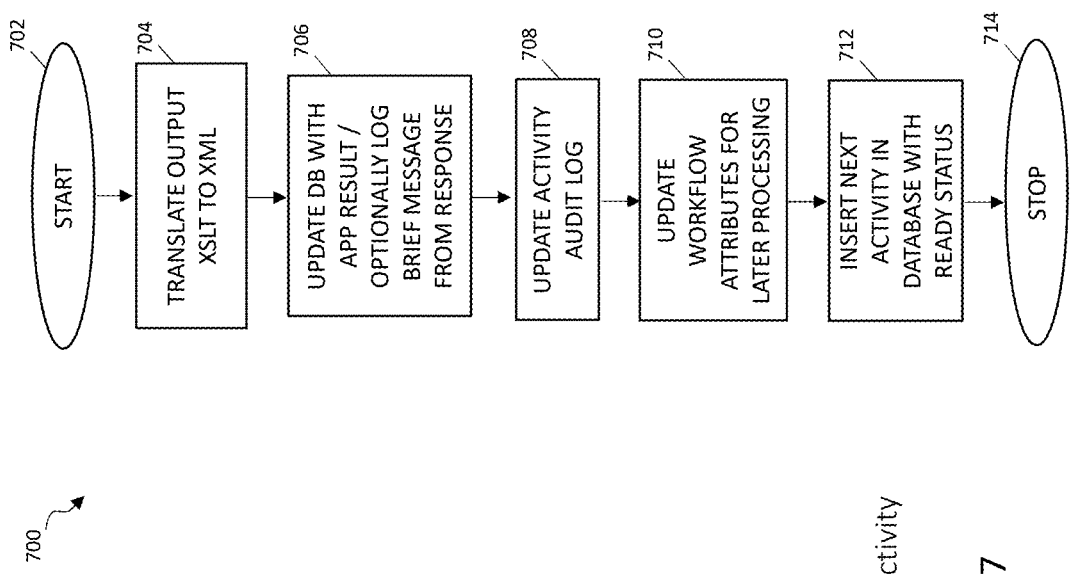
FIG. 7 is a diagram illustrating an example process flow including steps associated with post-activity, in accordance with an example implementation of the present application.

FIG. 5 is a diagram illustrating an example process flow, including steps 500 associated with auto processor 102 operations, in accordance with an example implementation of the present disclosure. At step 502, the process starts and the process definition is loaded from a database (step 504). Thereafter the process continues to step 506, and current activity and configuration information is read by the auto processor 102. For example, the information read by the auto processor 102 can be accessed from one or more databases. At step 508, a determination is made whether activity referenced in step 506 can be executed by the auto processor 102. If the determination at step 508 is affirmative, then the process branches to step 510 and pre-activity steps are performed, such as shown and described herein in connection with pre-activity steps 400. Thereafter, the process continues to step 512 and an application is invoked, such as shown and described herein, in connection with steps 600 (FIG. 6). Thereafter, the process continues to step 514 and post-activity processes are performed, such as shown and described herein in connection with steps 700 (FIG. 7). Thereafter, the process continues to step 516 and ends. Alternatively, if the determination at step 508 is negative, then scheduled/back/manual activities are performed and the process branches to step 516 and ends.

FIG. 6 is a diagram illustrating an example process flow including steps 600 associated with invoking an application, in accordance with an example implementation of the present application. At step 602, the process starts and content in a request formatted in XML is accessed (step 604). At step 606, information representing an API endpoint in the XML is identified. The API endpoint is used from the configuration to route the auto processor 102 to the external service (e.g., an external software application). Thereafter, at step 608, a service call is made by the auto processor 102, for example, through a service proxy API and, in response, a response is received from the external service. For example, the response can be formatted in XML or translated to XML if the response is formatted in XSLT or other format. Thereafter, the process flows to step 610 and ends.

FIG. 7 is a diagram illustrating an example process flow including steps 700 associated with post-activity, in accordance with an example implementation of the present application. At step 702, the process starts and output received, for example, from an external service. The output is translated from XSLT to XML (step 704). Thereafter, one or more databases are updated with resulting response received from the external service (step 706). In one or more implementations of the present disclosure, a message associated with a response from the external service can be logged in the one or more databases storing the response received from the external service. In addition to storing the response and a message associated therewith, at step 708 the auto processor 102 updates an audit log with information representing the activity performed in connection with the business process. Moreover, the auto processor 102 can update workflow attributes, for example for future processing (step 710). From step 710, the process continues to step 712 and the auto processor 102 updates one or more databases by inserting a ready status value for the next activity. Thereafter, the process continues to step 714 and ends.

Accordingly, as shown and described herein, the present disclosure includes technology enabling automation, such as performed by one or more computing devices configured as for performing activity routing in a single operation, without losing context of the workflow instance. Wait times that would otherwise incurred between respective processors is eliminated and context loading can be eliminated, thereby speeding up a business process significantly. By providing business logic to reside in a single place, logging is improved which improves a need for triaging issues that may arise. Moreover, the present disclosure can extend the capability to schedule and execute respective batch processes associated within a business process.

Figure 8:
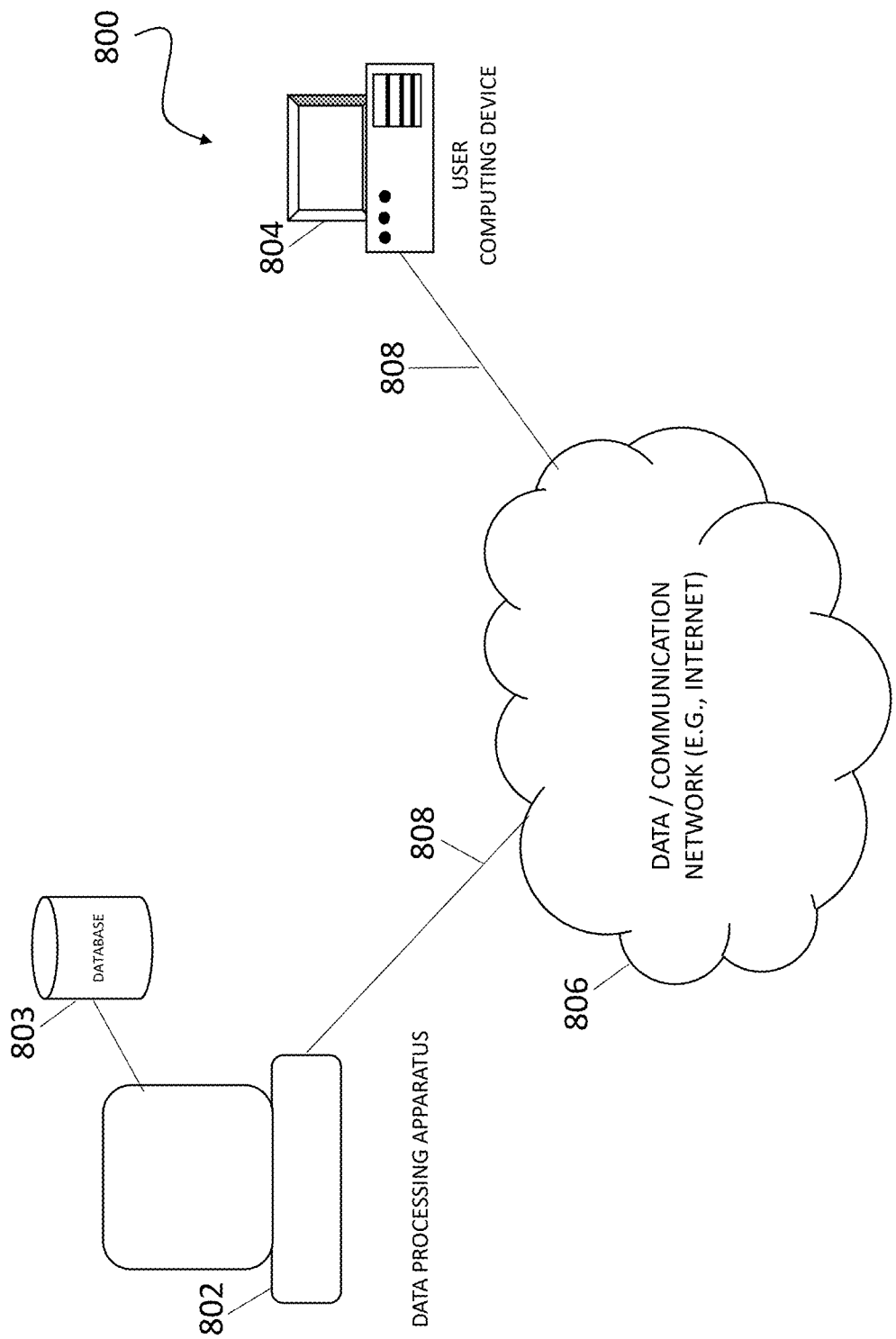
FIG. 8 is a diagram showing an example hardware arrangement that is configured for providing the systems and methods disclosed herein.

Referring to FIG. 8, a diagram is provided that shows an example hardware arrangement that is configured for providing the systems and methods disclosed herein and designated generally as system 800. System 800 can include one or more information processors 802 that are at least communicatively coupled to one or more user computing devices 804 across communication network 806. Information processors 802 and user computing devices 804 can include, for example, mobile computing devices such as tablet computing devices, smartphones, personal digital assistants or the like, as well as laptop computers and/or desktop computers, server computers and mainframe computers. Further, one computing device may be configured as an information processor 802 and a user computing device 804, depending upon operations being executed at a particular time.

With continued reference to FIG. 8, information processor 802 can be configured to access one or more databases 803 for the present disclosure, including source code repositories and other information. However, it is contemplated that information processor 802 can access any required databases via communication network 806 or any other communication network to which information processor 802 has access. Information processor 802 can communicate with devices comprising databases using any known communication method, including a direct serial, parallel, universal serial bus ("USB") interface, or via a local or wide area network.

User computing devices 804 can communicate with information processors 802 using data connections 808, which are respectively coupled to communication network 806. Communication network 806 can be any data communication network. Data connections 808 can be any known arrangement for accessing communication network 806, such as the public internet, private Internet (e.g., virtual private network ("VPN"), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 804 preferably have the ability to send and receive data across communication network 806, and are equipped with web browsers, software disclosures, or other means, to provide received data on display devices incorporated therewith. By way of example, user computing device 804 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marketed Internet access devices such as WebTV can be used. In addition, the hardware arrangement of the present invention is not limited to devices that are physically wired to communication network 806, and that wireless communication can be provided between wireless devices and information processors 802.

System 800 preferably includes software that provides functionality described in greater detail herein, and preferably resides on one or more information processors 802 and/or user computing devices 804. One of the functions performed by information processor 802 is that of operating as a web server and/or a web site host. Information processors 802 typically communicate with communication network 806 across a permanent i.e., un-switched data connection 808. Permanent connectivity ensures that access to information processors 802 is always available.

Figure 9:
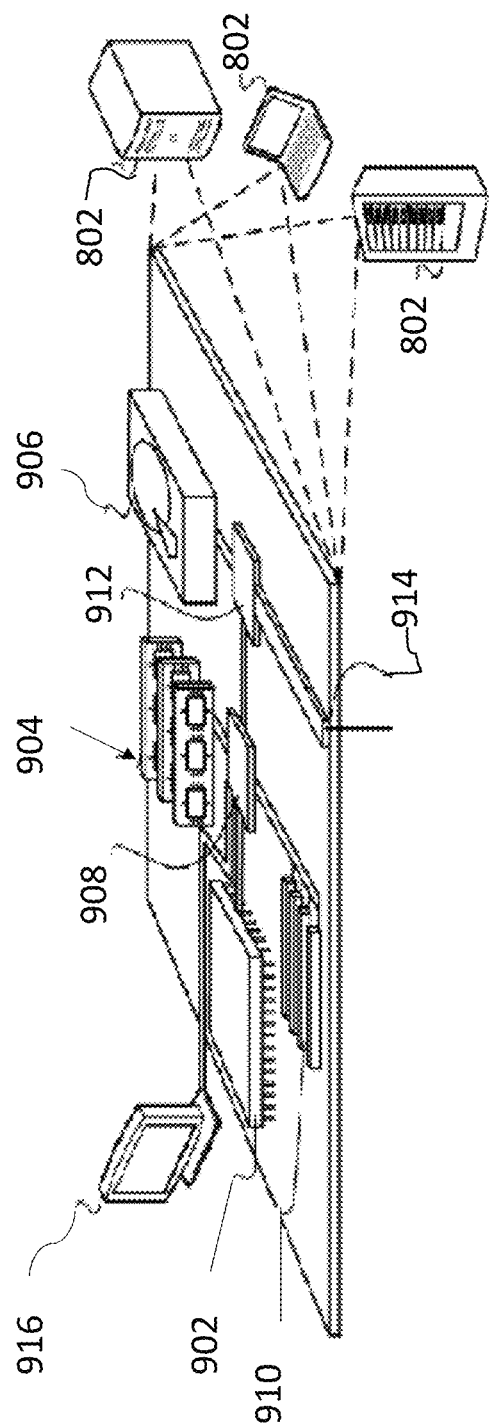
FIG. 9 shows an example information processor and/or user computing device that can be used to implement the techniques described herein.

FIG. 9 shows an example information processor 802 and/or user computing device 804 that can be used to implement the techniques described herein. The information processor 802 and/or user computing device 804 is intended to represent various forms of digital computers, such as laptops, desktops, workstations, personal digital assistants, servers, blade servers, mainframes, and other appropriate computers. The components shown in FIG. 9, including connections and relationships, and their functions, are meant to be exemplary only, and are not meant to limit implementations of the inventions described and/or claimed in this document.

As shown in FIG. 9, the information processor 802 and/or user computing device 804 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the information processor 802 and/or user computing device 804, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the information processor 802 and/or user computing device 804. In some implementations, the memory 904 is a volatile memory unit or units. In some implementations, the memory 904 is a non-volatile memory unit or units. The memory 904 can also be another form of computer-readable medium, such as a magnetic or optical disk.

The storage device 906 is capable of providing mass storage for the information processor 802 and/or user computing device 804. In some implementations, the storage device 906 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 can be configured to manage bandwidth-intensive operations, while the low-speed interface 912 can be configured to manage lower bandwidth-intensive operations. Of course, one of ordinary skill in the art will recognize that such allocation of functions is exemplary only. In some implementations, the high-speed interface 908 is coupled to the memory 904, the display 916 (e.g., through a graphics processor or accelerator), and to the high-speed expansion ports 910, which can accept various expansion cards (not shown). In an implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter. Accordingly, the automated methods described herein can be implemented by in various forms, including an electronic circuit configured (e.g., by code, such as programmed, by custom logic, as in configurable logic gates, or the like) to carry out steps of a method. Moreover, steps can be performed on or using programmed logic, such as custom or preprogrammed control logic devices, circuits, or processors. Examples include a programmable logic circuit (PLC), computer, software, or other circuit (e.g., ASIC, FPGA) configured by code or logic to carry out their assigned task. The devices, circuits, or processors can also be, for example, dedicated or shared hardware devices (such as laptops, single board computers (SBCs), workstations, tablets, smartphones, part of a server, or dedicated hardware circuits, as in FPGAs or ASICs, or the like), or computer servers, or a portion of a server or computer system. The devices, circuits, or processors can include a non-transitory computer readable medium (CRM, such as read-only memory (ROM), flash drive, or disk drive) storing instructions that, when executed on one or more processors, cause these methods to be carried out.

Any of the methods described herein may, in corresponding embodiments, be reduced to a non-transitory computer readable medium (CRM, such as a disk drive or flash drive) having computer instructions stored therein that, when executed by a processing circuit, cause the processing circuit to carry out an automated process for performing the respective methods.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It is further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed:

1. A computer-implemented method for managing and executing activities for uninterrupted processing, the method comprising:
   providing at least one computing device, configured by executing instructions stored on non-transitory processor readable media, operating on a data communications network;
   accessing, by the at least one computing device, a plurality of process definitions, each of the plurality of process definitions comprising information representing a plurality of activities to be executed by respective computing devices located outside of the data communications network;
   executing, by the at least one computing device, a single process instance for each respective one of the plurality of process definitions, wherein the single process instance includes:
   for each of the respective ones of the plurality of process definitions:
      identifying, by the at least one computing device, respective ones of the plurality of activities for the respective process definition;
      accessing, by the at least one computing device, information representing details associated with each respective one of the plurality of activities;
      for each respective one of the plurality of activities:
         identifying, by the at least one computing device, at least one respective endpoint for executing steps associated with the respective one of the plurality of activities;
         assessing, by the at least one computing device, whether the at least one computing device can automatically cause the respective endpoint to execute the steps;
         where the result of the assessing is that at least one computing device can automatically cause the respective endpoint to execute the steps:
            automatically sending, by the at least one computing device to the at least one respective endpoint, a service call for executing at least one of the steps associated with the respective one of the plurality of activities;
            automatically receiving, by the at least one computing device from the at least one other computing device, in response to sending the service call, activity status information representing a status of the at least one of the steps associated with the respective one of the plurality of activities;
            automatically storing, by the at least one computing device in at least one database, the activity status information; and
            automatically determining, by the at least one computing device as a function of exit criteria, completion of the respective one of the plurality of activities;
         where the result of the assessing is that the at least one computing device cannot automatically cause the respective endpoint to execute the steps:
            automatically determining, by the at least one computing device as a function of exit criteria, completion of the activity.

2. The method of claim 1, wherein the information representing details associated with the respective one of the plurality of activities includes a respective application programming interface ("API"); and
further wherein transmitting the service request to the at least one respective endpoint is via the respective API.

3. The method of claim 1, further comprising:
for at least one of the plurality of activities:
performing, by the at least one computing device, pre-processing comprising updating an activity audit log with information representing the at least one of the plurality of activities.

4. The method of claim 3, further comprising:
determining, by the at least one computing device, the information representing details associated with the respective one of the plurality of activities includes content formatted in extensible style sheet language; and
translating, by the at least one computing device, the content from the extensible style sheet language to extensible markup language.

5. The method of claim 1, further comprising:
for at least one of the plurality of activities:

performing, by the at least one computing device, post-processing.

6. The method of claim 5, wherein the post-processing comprises at least one of:
updating an activity log;
updating at least one database with workflow attributes for future processing; and
adding information associated with another activity in at least one database.

7. The method of claim 1, further comprising:
determining, by the at least one computing device, output received from the at least one respective endpoint includes content formatted in extensible style sheet language; and
translating, by the at least one computing device, the output from the extensible style sheet language to extensible markup language.

8. The method of claim 1, further comprising:
accessing, by the at least one computing device, metadata stored in at least one database,
wherein the metadata includes information associated with the respective plurality of activities.

9. The method of claim 1, wherein the activities set forth in the plurality of process definitions are executed by at least one computing device in response to at least one determination made by the at least one computing device in response to output received from the at least one respective computing device endpoint.

10. The method of claim 1, wherein the activity status information represents a respective activity is completed.

11. A computer-implemented system for managing and executing activities for uninterrupted processing, the system comprising:
at least one computing device, configured by executing instructions stored on non-transitory processor readable media for:
operating on a data communications network;
accessing a plurality of process definitions, each of the plurality of process definitions comprising information representing a plurality of activities to be executed by respective computing devices located outside of the data communications network;
executing a single process instance for each respective one of the plurality of process definitions, wherein the single process instance includes:
for each of the respective ones of the plurality of process definitions:
identifying respective ones of the plurality of activities for the respective process definition;
accessing information representing details associated with each respective one of the plurality of activities;
for each respective one of the plurality of activities:
identifying at least one respective endpoint for executing steps associated with the respective one of the plurality of activities;
assessing, by the at least one computing device, whether the at least one computing device can automatically cause the respective endpoint to execute the steps;
where the result of the assessing is that at least one computing device can automatically cause the respective endpoint to execute the steps:
automatically sending, by the at least one computing device, to the at least one respective endpoint, a service call for executing at least one of the steps associated with the respective one of the plurality of activities;
automatically receiving, by the at least one computing device from the at least one other computing device, in response to sending the service call, activity status information representing a status of the at least one of the steps associated with the respective one of the plurality of activities;
automatically storing, by the at least one computing device in at least one database, the activity status information; and
automatically determining, by the at least one computing device as a function of exit criteria, completion of the respective one of the plurality of activities;
where the result of the assessing is that the at least one computing device cannot automatically cause the respective endpoint to execute the steps:
automatically determining, by the at least one computing device as a function of exit criteria, completion of the activity.

12. The system of claim 11,
wherein the input representing details associated with the respective one of the plurality of activities includes a respective application programming interface ("API"); and
wherein the at least one computing device is further configured by executing instructions stored on non-transitory processor readable media for:
transmitting the information to the at least one respective computing device is via the respective API.

13. The system of claim 11, wherein the at least one computing device is further configured by executing instructions stored on non-transitory processor readable media for:
for at least one of the plurality of activities:
performing pre-processing comprising updating an activity audit log with information representing the at least one of the plurality of activities.

14. The system of claim 13, wherein the at least one computing device is further configured by executing instructions stored on non-transitory processor readable media for:
determining the input includes content formatted in extensible style sheet language; and
translating the content from the extensible style sheet language to extensible markup language.

15. The system of claim 11, wherein the at least one computing device is further configured by executing instructions stored on non-transitory processor readable media for:
for at least one of the plurality of activities:
performing post-processing.

16. The system of claim 15, wherein the post-processing comprises at least one of:
updating an activity log;
updating at least one database with workflow attributes for future processing; and
adding information associated with another activity in at least one database.

17. The system of claim 11, wherein the at least one computing device is further configured by executing instructions stored on non-transitory processor readable media for:
determining output received from the at least one respective computing device includes content formatted in extensible style sheet language; and
translating the output from the extensible style sheet language to extensible markup language.

18. The system of claim 11, wherein the at least one computing device is further configured by executing instructions stored on non-transitory processor readable media for:

accessing metadata stored in at least one database,
wherein the metadata includes information associated with the respective plurality of activities.

\* \* \* \* \*